(12) United States Patent
Lee et al.

(10) Patent No.: US 10,440,445 B2
(45) Date of Patent: Oct. 8, 2019

(54) METHOD OF PROVIDING ADVERTISING SERVICES AND ELECTRONIC DEVICE ADAPTED TO THE SAME

(71) Applicant: Samsung Electronics Co., Ltd., Suwon-si (KR)

(72) Inventors: Gyetak Lee, Seoul (KR); Yoonsoo Bae, Gwacheon-si (KR); Suwon Lee, Guri-si (KR); Hyunmin Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 364 days.

(21) Appl. No.: 14/952,696

(22) Filed: Nov. 25, 2015

(65) Prior Publication Data
US 2016/0150289 A1    May 26, 2016

(30) Foreign Application Priority Data
Nov. 25, 2014  (KR) .................. 10-2014-0164983

(51) Int. Cl.
*H04N 7/16*   (2011.01)
*H04N 21/81*  (2011.01)
(Continued)

(52) U.S. Cl.
CPC .......... *H04N 21/812* (2013.01); *G06Q 10/00* (2013.01); *G06Q 30/00* (2013.01);
(Continued)

(58) Field of Classification Search
CPC .......... H04N 21/812; H04N 21/44204; H04N 21/2407; H04N 21/26241; H04N 21/4622;
(Continued)

(56) References Cited

U.S. PATENT DOCUMENTS 7,068,724 B1 *  6/2006  Hamilton ......... H04N 21/23608
                                        375/240.26
8,341,550 B2 * 12/2012  de Heer ........... H04N 21/23424
                                        705/14.4
(Continued)

FOREIGN PATENT DOCUMENTS

CN      101009805 A      8/2007
CN      101848358 A      9/2010
(Continued)

OTHER PUBLICATIONS

European Search Report dated Dec. 10, 2015 corresponding to European Application No. 15195717.2-1958.
(Continued)

*Primary Examiner* — Michael B. Pierorazio
(74) *Attorney, Agent, or Firm* — Jefferson IP Law, LLP

(57) ABSTRACT

A method of providing advertising services through broadcasts and an electronic device adapted to the method are provided. The electronic device includes: a communication unit for receiving viewing information from at least one client and advertising schedule information from at least one broadcast server; a controller for analyzing the effectiveness of advertising that can be expected when particular advertisement content is broadcast, based on the viewing information and the advertising schedule information, and determining a broadcasting time or a broadcast server that broadcasts the particular advertisement content, according to the analysis result; and a storage unit for storing the viewing information, the advertisement schedule information, or information about at least one advertisement content item.

16 Claims, 10 Drawing Sheets

(51) Int. Cl.
*H04N 21/25* (2011.01)
*H04N 21/45* (2011.01)
*H04N 21/466* (2011.01)
*H04N 21/242* (2011.01)
*H04N 21/43* (2011.01)
*H04N 21/2547* (2011.01)
*G06Q 30/02* (2012.01)
*G06Q 10/00* (2012.01)
*G06Q 30/00* (2012.01)

(52) U.S. Cl.
CPC ....... *G06Q 30/0264* (2013.01); *H04N 21/242* (2013.01); *H04N 21/252* (2013.01); *H04N 21/2547* (2013.01); *H04N 21/4302* (2013.01); *H04N 21/4532* (2013.01); *H04N 21/4667* (2013.01)

(58) Field of Classification Search
CPC .......... H04N 21/4532; H04N 21/2547; H04N 21/242; H04N 21/4302; H04N 21/252; H04N 21/4667; H04H 20/14; G06Q 30/02; G06Q 30/0242; G06Q 30/0201; G06Q 30/0264; G06Q 30/0273; G06Q 30/0241; G06Q 30/0244
See application file for complete search history.

(56) References Cited

U.S. PATENT DOCUMENTS

| | | | |
|---|---|---|---|
| 8,689,266 B2* | 4/2014 | Bhogal | H04N 7/17318 725/10 |
| 8,782,683 B2* | 7/2014 | Balakrishnan | H04N 21/44222 725/14 |
| 10,085,074 B2* | 9/2018 | Hood | G06Q 30/0247 |
| 2003/0163345 A1 | 8/2003 | Itagaki et al. | |
| 2007/0169145 A1 | 7/2007 | Ko et al. | |
| 2009/0187939 A1* | 7/2009 | Lajoie | G06Q 30/02 725/34 |
| 2011/0035270 A1* | 2/2011 | Matsunaga | G06F 17/30893 705/14.41 |
| 2013/0080194 A1 | 3/2013 | Im et al. | |
| 2013/0085851 A1 | 4/2013 | Pedro et al. | |
| 2013/0205315 A1 | 8/2013 | Sinha et al. | |
| 2014/0085499 A1 | 3/2014 | Na et al. | |
| 2014/0196081 A1* | 7/2014 | Emans | G06Q 30/0273 725/32 |
| 2014/0278749 A1* | 9/2014 | Trenkle | G06Q 30/0201 705/7.29 |
| 2016/0050457 A1* | 2/2016 | Mondal | H04N 21/44204 725/18 |
| 2016/0080789 A1* | 3/2016 | Muller | H04N 21/25883 725/14 |

FOREIGN PATENT DOCUMENTS

| | | |
|---|---|---|
| CN | 102110265 A | 6/2011 |
| KR | 10-0818872 | 3/2008 |
| KR | 20110023617 | 3/2011 |

OTHER PUBLICATIONS

Chinese Office Action dated Jan. 28, 2019, issued in Chinese Patent Application No. 201510831232.6.

* cited by examiner

| Campaign | | | |
|---|---|---|---|
| CATEGORY | AdHub (OPTIMIZED ADVERTISEMENT) | TV PLATFORM (GENERAL ADVERTISEMENT) | INTEGRATION |
| Budget | 7,000,000 | 800,000,000 | 870,000,000 |
| Reach 1 | 50 | 85 | 88 |
| Reach 2 | 35 | 75 | 79 |
| Reach 3 | 20 | 60 | 66 |
| Reach 4 | Reach 4 | 35 | 38 |
| Reach 5 | Reach 5 | 20 | 22 |
| GRP | 100 | 400 | 500 |
| GPRP | 700,000 | 2,000,000 | 1,740,000 |

FIG. 8

| Campaign | Campaign Name | Samsung Galaxy Note 4 |
|---|---|---|
| | Budget | 70,000,000 KRW (Min, ₩10,000,000) |
| | VALID FREQUENCY | 2 |
| | EXPECTED REACH (Reach 2+) | 15% ~ 28% (AVERAGE, EXPECTED REACH OF 22%) |

| R | H | M | MON | TUE | WED | THU | FRI |
|---|---|---|---|---|---|---|---|
| C | 6 | 05 | EVERYDAY GYMNASTICS 870 | | | | |
| | | | TO THE WORLD 870 | | | | |
| B | 7 | | GOOD MORNING 2,190 | | | | |
| A | 8 | | MORNING NEWS 2,790 | | | | |
| | 9 | 40 | SOAP OPERA 5,025 | | | | |
| B | 10 | 50 | LEISURE 3,195 | | | | |
| | 11 | 15 | GLOBAL VILLAGE 1,950 | | | | |
| | | 45 | FAMILY LOVE 1,650 | | | | |
| | PM 12 | | REBROADCASTING OF SOAP OPERA 1,500 | | | | |
| | 1 | | | | | | |
| C | 2 | 10 | NOON NEWS 1,650 | | | | |
| | | | REBROADCAST 1,500 | | | | |
| | 3 | 25 | TOSS (REBROADCAST) 1,215 | | | | |
| | | 55 | CARTOON (REBROADCAST) 1,215 | | | | CARTOON (REBROADCAST) 1,215 |
| | | | KINDERGARTEN 1,380 | | | | |
| | 4 | 25 55 | B CARTOON 1,380 | ANIMATION 1,380 | THE THOUSAND-CHARACTER TEXT 1,380 | | WHO DOES WELL 1,290 |
| | 5 | | ENTERTAINMENT (REBROADCAST) 1,650 | | | | A CARTOON 1,650 |
| B | 6 | 30 | GLOBAL 4,350 | | | | |
| | | | INFORMATION COMMUNICATION 7,860 | | | | MUSIC 6,075 |
| A | 7 | | | | | | |

1010 1020 1030 1001

METHOD OF PROVIDING ADVERTISING SERVICES AND ELECTRONIC DEVICE ADAPTED TO THE SAME

RELATED APPLICATION(S)

This application claims priority under 35 U.S.C. § 119(a) to a Korean Patent Application Serial No. 10-2014-0164983, which was filed in the Korean Intellectual Property Office on Nov. 25, 2014, the entire content of which is hereby incorporated by reference.

BACKGROUND

Various embodiments of the present disclosure relate to a method of providing advertising services through broadcasts and an electronic device adapted to the method.

Conventional television (TV) broadcasting advertising system is a pre-purchase system where sponsors purchase advertisements at least one to six months before the advertisement is aired. The unit cost of advertisement sales is fixed based on a time-based system, and thus, the same time slot requires a similar unit cost of advertising. This conventional advertising system requires sponsors to pay the contract money in advance, regardless of the advertising execution result (e.g., view rate). Therefore, because of the inconsistency between a time point that the advertisement is purchased and a time point that the advertisement is aired, the correlation between the advertisement purchase amount and the effectiveness of advertising is low, which means the advertisement purchase is inefficient (ineffective). In addition, when the view rate of an advertisement is low, it is difficult to achieve a target value of the effectiveness of advertising, and thus the advertising is ineffective.

SUMMARY

Various embodiments of the present disclosure have been made in view of the above problems, and provide a method of providing advertising services and efficient, effective advertising by reflecting a real-time view rate and an electronic device adapted to the method.

In accordance with an embodiment of the present disclosure, the present disclosure provides an electronic device comprising: a communication unit for receiving viewing information from at least one client and advertising schedule information from at least one broadcast server; a controller for analyzing the effectiveness of advertising that can be expected when particular advertisement content is broadcast, based on the viewing information and the advertising schedule information, and determining a broadcasting time or a broadcast server that will broadcast the particular advertisement content, according to the analysis result; and a storage unit for storing the viewing information, the advertisement schedule information, or information about at least one advertisement content item.

In accordance with another embodiment of the present disclosure, the present disclosure provides a method of providing advertising services comprising: receiving viewing information from at least one client; receiving advertising schedule information from at least one broadcast server; analyzing the effectiveness of advertising that can be expected when particular advertisement content is broadcast, based on the viewing information and the advertising schedule information, and determining a broadcasting time or a broadcast server that will broadcast the particular advertisement content; and transmitting, to the determined broadcast server, an advertising request for broadcasting the particular advertisement content during the determined broadcasting time.

BRIEF DESCRIPTION OF THE DRAWINGS

The features and advantages of the disclosure will become more apparent from the following detailed description in conjunction with the accompanying drawings, in which:

FIG. 8 is a diagram showing data obtained from an analysis of the advertisement content execution result by a method and an electronic device for providing advertising services according to an embodiment of the present disclosure;

FIG. 9 is a diagram showing a process to set a target value of an effectiveness of advertising by a method and an electronic device for providing advertising services according to an embodiment of the present disclosure; and FIG. 10 is a diagram showing an advertising schedule used in a method and an electronic device for providing advertising services according to an embodiment of the present disclosure.

DETAILED DESCRIPTION

Figure 1:
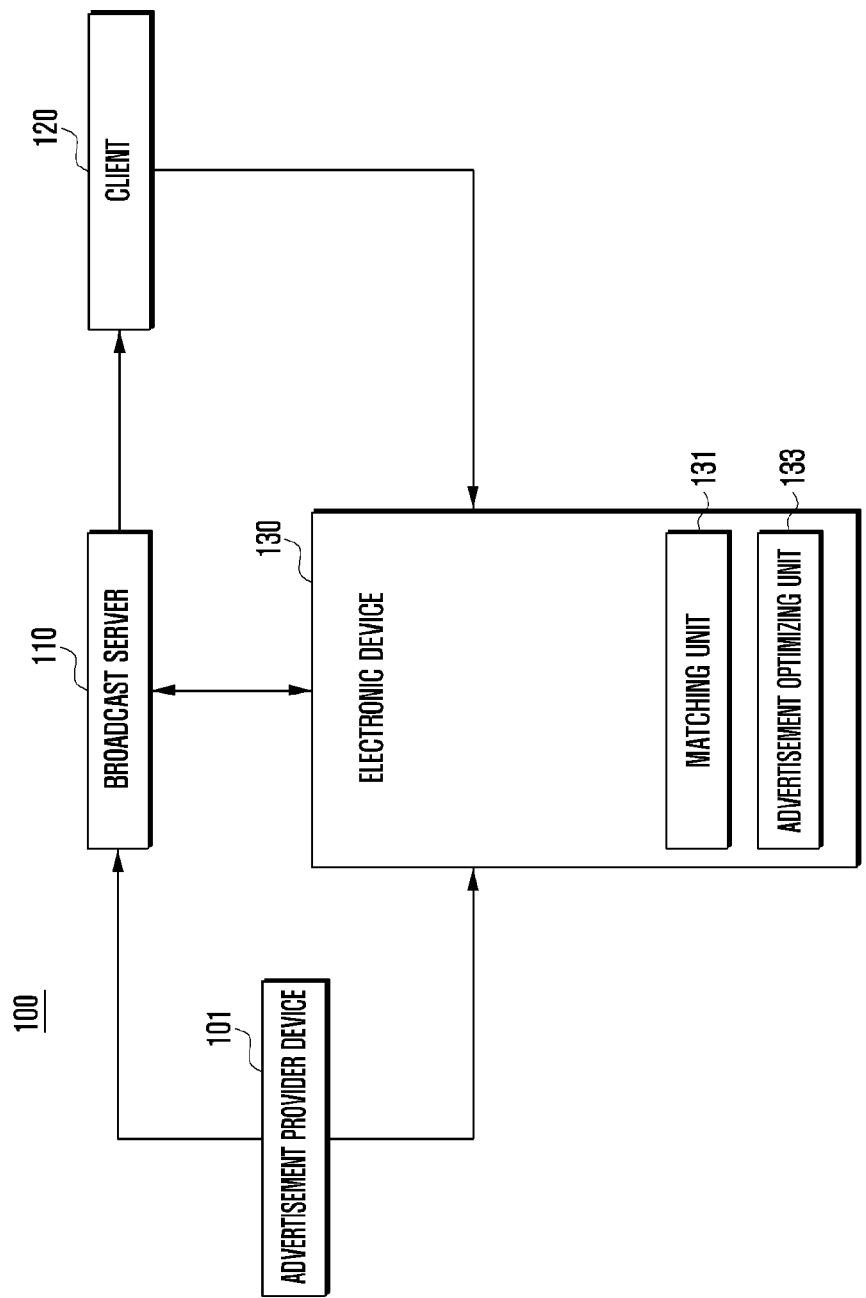
FIG. 1 is a block diagram showing a system for providing advertising services according to an embodiment of the present disclosure.

Hereinafter, various embodiments of the present disclosure will be described with reference to the accompanying drawings. The present disclosure may have various embodiments, and modifications and changes may be made therein. Therefore, the present disclosure will be described in detail with reference to particular embodiments shown in the accompanying drawings. However, it should be understood that there is no intent to limit the present disclosure to the particular forms, and the present disclosure should be construed to cover all modifications, equivalents, and/or alternatives falling within the spirit and scope of the present disclosure. In describing the drawings, similar elements are designated by similar reference numerals.

As disclosed in the various embodiments of the present disclosure, the expression "include" or "may include" refers to the existence of a corresponding function, operation, or constituent element, and does not limit one or more additional functions, operations, or constituent elements. Further, as used in various embodiments of the present disclosure, the term such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

As used in various embodiments of the present disclosure, the expression "or" includes any or all combinations of words enumerated together. For example, the expression "A or B" may include A, may include B, or may include both A and B.

While expressions including ordinal numbers, such as "first" and "second", as used in the present disclosure may modify various constituent elements, such constituent elements are not limited by the above expressions. For example, the above expressions do not limit the sequence and/or importance of the corresponding constituent elements. The above expressions may be used merely for the purpose of distinguishing a constituent element from other constituent elements. For example, a first user device and a second user device indicate different user devices although both are user devices. For example, a first constituent element may be termed a second constituent element, and likewise a second constituent element may also be termed a first constituent element without departing from the scope of the present disclosure.

The terms as used in various embodiments of the present disclosure are merely for the purpose of describing particular embodiments and are not intended to limit the present disclosure. Singular forms are intended to include plural forms unless the context clearly indicates otherwise.

Unless defined otherwise, all terms used herein, including technical terms and scientific terms, have the same meaning as commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to various embodiments of the present disclosure may be a server system including at least one or more servers. The electronic device according to various embodiments of the present disclosure may include a broadcast platform or an advertisement platform used in a broadcasting system. Clients or electronic devices according to various embodiments of the present disclosure may be equipped with a broadcast receiving function and/or a communication function. For example, the electronic device or client may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smartwatch).

According to some embodiments, the electronic device or client may be a smart home appliance with a broadcast receiving function and/or a communication function. The smart home appliance, for example, an electronic device, may include at least one of a television, a digital video disk (DVD) player, an audio, a refrigerator, an air conditioner, a cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic photo frame.

According to some embodiments, the electronic device or client may include at least one of various medical devices (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), an automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) in a shop.

According to some embodiments, the electronic device or client may include at least one of a part of furniture or a building/structure, an electronic board, an electronic signature receiving device, a projector, and various kinds of measuring instruments (e.g., a water meter, an electric meter, a gas meter, and a radio wave meter), which are equipped with a broadcast receiving function and/or a communication function. The electronic device according to various embodiments of the present disclosure may be a combination of one or more of the aforementioned various devices. Further, the electronic device according to various embodiments of the present disclosure may be a flexible device. It will be apparent to those skilled in the art that the electronic device according to various embodiments of the present disclosure is not limited to the aforementioned devices.

Hereinafter, an electronic device according to various embodiments of the present disclosure will be discussed with reference to the accompanying drawings. The term "a user" as used in various embodiments may refer to any person who uses an electronic device or any other device (e.g., an artificial intelligence electronic device) using an electronic device.

In various embodiments, the term 'screen' may refer to a screen of a display. For example, in the following expressions 'broadcast content is displayed on a screen,' a display displays broadcast content on the screen' or 'a controller controls a display to display broadcast content on the screen,' the screen refers to 'a screen of the display.' In addition, the term 'screen' may also be used in the sense of an 'object' displayed on the display. For example, in the following expressions 'a broadcast screen is displayed,' a display displays a broadcast screen' or 'a controller controls a display to display a broadcast screen,' the term 'screen' refers to an 'object displayed on the screen.'

In various embodiments, a client, server and external device refer to an electronic device with a broadcast receiving function and/or a communication function. The term 'external' in the external device is used in the sense of a relative concept from the viewpoint of one electronic device, and refers to the other electronic device that differs from the one electronic device. Therefore, it should be understood that the functions or operations of the external device and electronic device are not limited by the terms. In addition, the terms 'client' and 'server' are used in the sense of a relative concept from the viewpoints of one to the other as one requests information and the other provides the information to the other one in response to the request. Therefore, it should be understood that the functions or operations of the client and server are not limited by the terms.

Hereinafter, various embodiments of the present disclosure will be described with reference to the accompanying drawings.

FIG. 1 is a block diagram showing a system 100 for providing advertising services according to an embodiment of the present disclosure.

The advertising service providing system 100 for providing advertising services may include an advertisement provider device 101, a broadcast server 110, a client 120 and an electronic device 130.

The advertisement provider device 101 may provide advertisement content of an advertiser to the advertising service providing system 100. According to an embodiment, the advertisement provider device 101 may include a mobile device (not shown) or a server (not shown) of an advertiser (not shown), a media representative (not shown) or a server (not shown) of an advertising agency (not shown), etc. That is, the advertisement provider device 101 may receive advertisement material for advertisement content from an advertisement provider (e.g., advertiser) and may provide the advertisement material to the broadcast server 110. The advertisement provider device 101 may provide an order of advertisement content to the electronic device 130.

The broadcast server 110 may transmit the broadcast content or advertisement content to the client 120. For example, the broadcast server 110 may include at least one broadcast server of at least one broadcasting station (not shown). The broadcast server 110 may create broadcast content and provide the created broadcast content to the client 120. The broadcast server 110 may edit advertisement material received from an advertisement provider to create advertisement content. The broadcast server 110 may transmit the advertisement content to the client 120.

The client 120 may display broadcast content or advertisement content received from the broadcast server 110. For example, the client 120 may be a smart TV. The client 120 may transmit viewing information to the electronic device 130. For example, the client 120 may transmit information related to the broadcast content or advertisement content, currently displayed, to the electronic device 130. For example, the client 120 may transmit, to the electronic device 130, information about the broadcast server 110 (e.g., a particular broadcasting station) that provides broadcast content that is currently being viewed. When particular advertisement content is being viewed, the client 120 may inform the electronic device 130 that the particular advertisement content has been viewed. According to an embodiment, the client 120 may transmit information about the client 120 and/or information about the user of the client 120 to the electronic device 130.

According to an embodiment, the client 120 may receive user inputs from an external input device, e.g., a mobile device (not shown) or a TV remote controller (not shown).

The electronic device 130 may receive information about advertisement content items from the advertisement provider device 101. For example, the electronic device 130 may receive information about advertisement content that has not been sold from the advertisement provider device 101. The information about advertisement content may include the length of advertisement content (e.g., running time), the content, information about an advertisement target value, etc. The advertisement target value may include a budget for selling corresponding advertisement content, a target frequency, a reach, an effective reach (reach n+), and gross rating point (GRP). The term 'reach' is a standard for determining the number of viewers reached through advertising, and refers to a measurement representing a fraction of viewers exposed to an advertisement in a particular area during a predetermined period of time. The term 'frequency' refers to a number of average views, and is a measurement representing the number of viewers viewing an advertisement during a predetermined period of time. The term 'effective reach (reach n+)' refers to a measurement representing a fraction of viewers viewing an advertisement by a valid frequency (the number of exposure (views) to an advertisement, required for making a change in the viewers' attitude, mind, behavior, etc.) in a particular area, during a predetermined period of time. For example, reach 3 may refer to a fraction of viewers viewing particular advertisement content more than three times in a particular sample group (e.g., during a particular period of time or in a particular area). Gross Rating Point (GRP) refers to a measurement representing the summation of view rates or the total view rate. For example, when particular broadcast content is broadcast along with three broadcast programs (broadcast content items), A, B and C, and the view rates of A, B, and C are 20%, 10% and 15% respectively, the GRP of the advertisement content is 45 GRPs.

The electronic device 130 may receive advertising schedule information from the broadcast server 110. The advertising schedule information may include information about particular time slots during which advertisement content may be broadcast. For example, the advertising schedule information may be broadcast program schedule information. For example, advertisement content of about 5 minutes may be inserted between Program A broadcasting from 3:00 p.m. to 3:55 p.m. on Tuesday, and Program B broadcasting from 4:00 p.m. to 5:00 p.m. on Tuesday. In this case, the advertising schedule information may be information notifying the broadcast server 110 that advertisement content may be broadcast for 5 minutes from 3:55 p.m. to 4:00 p.m. on Tuesday.

The electronic device 130 may analyze a real-time view rate based on viewing information received from the client 120. For example, the electronic device 130 may detect, in real-time, a view rate of broadcast content that the broadcast server 110 is broadcasting, by using viewing information received from a plurality of clients.

The electronic device 130 may determine the broadcast server 110 that may be suitable and the broadcasting time that may be proper to achieve a target value of a particular advertisement content item, based on a real-time view rate and an advertisement target value received from the advertisement provider device 101.

The electronic device 130 may transmit a broadcasting request to the broadcast server 110, so that the particular advertisement content can be broadcast during the broadcasting time determined. According to an embodiment, when the advertisement content has reached an advertisement target value, the electronic device 130 may create data from an analysis of an execution result of the advertisement content (i.e., a broadcasting result of advertisement content).

According to an embodiment, the electronic device 130 may include a matching unit 131 and an advertising optimization unit 133. The matching unit 131 may include a particular server, e.g., auto content recognition (ACR) server (not shown). The matching unit 131 may analyze a view rate of the client 120, based on viewing information received from the client 120. For example, the matching unit 131 may transmit information related to particular content to the client 120. The matching unit 131 may also receive information about content being viewed from the client 120, compare the received information with stored data, map the received information to the store data, and analyze a view rate and information about content that the client 120 is viewing.

The advertising optimization unit 133 may include a particular server, e.g., AdHub server or AdHub platform. The advertising optimization unit 133 may analyze an effectiveness of advertising that can be expected when at least one advertisement content item is broadcast, based on advertising schedule information received from an advertisement server and a real-time view rate of the client 120. The advertising optimization unit 133 may determine a broadcast server 110 that broadcasts particular advertisement content or broadcasting times during which the advertisement content items is broadcast, based on the effectiveness of advertising that was determined. The advertising optimization unit 133 may request the broadcast server 110 to broadcast the corresponding advertisement content items at the broadcasting times respectively.

According to various embodiments of the present disclosure, the matching unit 131 and the advertising optimization unit 133 may be devices, servers or platforms, which may be separated, respectively. The matching unit 131 and the advertising optimization unit 133 may be integrated into one device, such as the electronic device 130.

Figure 2:
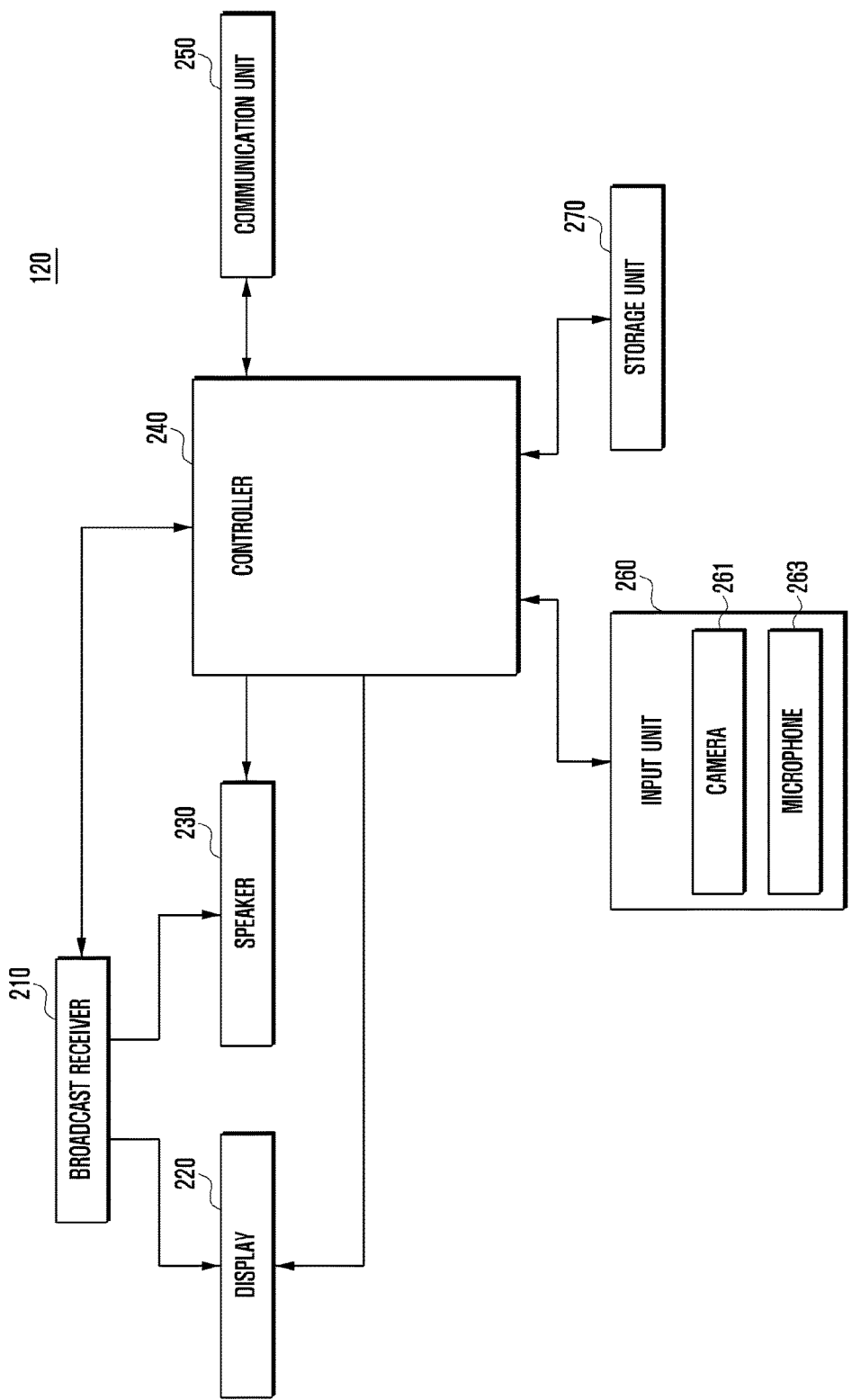
FIG. 2 is a block diagram showing a client according to an embodiment of the present disclosure.

FIG. 2 is a detailed block diagram of the client 120 shown in FIG. 1, according to an embodiment of the present disclosure.

The client 120 may include a broadcast receiver 210, a display 220, a speaker 230, a controller 240, a communication unit 250, an input unit 260 and a storage unit 270.

The broadcast receiver 210 may receive broadcast content under the control of the controller 240, divide it into a video and audio and transmit them to the display 220 and the speaker 230, respectively. The broadcast receiver 210 may include a module for receiving terrestrial broadcast, satellite broadcast, cable broadcast or Internet protocol television (IPTV) broadcast.

The display 220 may display various data under the control of the controller 240. The display 220 may include a display panel or a hologram unit. The display panel may be implemented with a liquid crystal display (LCD) or active matrix organic light emitting diode (AM-OLED), etc. The display panel may be implemented in a flexible, transparent, or wearable form. The hologram unit may show a stereoscopic image in the air using interference of light. In an embodiment, the display 220 may be implemented as an external device separated from the client 120. For example, the display 220 and the client 120 may be a TV and a set-top box, respectively, and, they are connected to each other with a high definition multimedia interface (HDMI).

The speaker 230 may convert audio signals received from the controller 240 or the broadcast receiver 210 into sound waves and output them.

The controller 240 may control the entire operation of the client 120 and signals flowing between components, and may process data therebetween.

The controller 240 may extract a fingerprint from broadcast content or advertisement content. A 'fingerprint' is information to identify broadcast content, and may also be called identifier or identification information. The controller 240 may transmit at least one extracted fingerprint to the electronic device 130 (of FIG. 1) through the communication unit 250. The controller 240 may also transmit device information about the client 120, location information, user information, etc. to the electronic device 130, along with the fingerprint.

The device information may include information about the device type (e.g., smartphone, TV, etc.), a manufacture year, information about the type and performance of built-in configurations (hardware and software), etc.

The location information may include at least one of the following: latitude and longitude, address, and address-related information. The address-related information may include at least one of the following: information about a building at the address (e.g., a name of a building, a name of a restaurant, a name of a council building, etc.), information about a structure (e.g., a name of a tunnel, a name of a mountain, a cell ID of a base station, etc.), an IP address of an address, and a phone number corresponding to the address.

The user information may be information about one of the users who have registered on the client 120, and the user who is using the client 120 (e.g., which is viewing a broadcast). For example, in a state where the client 120 is connected to an external device, e.g., a mobile device, (not shown), the client 120 may identify the user by using information received from the external device, e.g., a phone number, name, etc. In another embodiment, the controller 240 may operate a camera 261 to take images, extract characteristic information related to features (e.g., face, eyes, iris, etc.) from the images, compare the characteristic information with the stored user's information, and recognize the user based on the comparison. In another embodiment, the controller 240 may operate a microphone 263 to collect voice data, extract voice characteristic information (e.g., a voice frequency, voice tone, etc.) from the voice data, compare the extracted voice characteristic information with stored characteristic information, and recognize the user based on the comparison.

According to an embodiment, the controller 240 may create viewing information. The viewing information may include: information about advertisement content or broadcast content that the client 120 receives and displays from a broadcast server (e.g., the broadcast server 110 of FIG. 1); information about the broadcast server that has transmitted the broadcast content and the advertisement content; information about the client 120; and information about the user of the client 120. In an embodiment, the controller 240 may obtain information about broadcast content or advertisement content, cooperating with the matching unit 131 (e.g., Auto Content Recognition (ACR) server) of the electronic device 130.

The communication unit 250 may establish communication with an external device (e.g., the advertisement provider device 101 or an electronic device 130) through a network, such as a mobile communication network (e.g., LTE), wireless or wired local area network (LAN), etc., and perform data communication with the connected external device, under the control of the controller 240. The communication unit 250 may establish direct connection with an external device, through a peer-to-peer way (e.g., Wi-Fi direct, Bluetooth, etc.), without a relay (e.g., an access point (AP), and perform data communication with the connected external device. In an embodiment, the communication unit 250 may transmit the viewing information to the electronic device 130 under the control of the controller 240.

The input unit 260 may receive user inputs to transmit them to the controller 240. The input unit 260 may include a camera 261 and a microphone 263. The camera 261 may take still images or videos, as user inputs, and transmit them to the controller 240. In an embodiment, the camera 261 may include one or more image sensors, a lens (lenses), an image signal processor (ISP), and a flash (e.g., LED or xenon lamp). The microphone 263 may convert audio waves (user input) into audio signals and transmit them to the controller 240. In an embodiment, the input unit 260 may further include a keypad or a touch panel (not shown) installed at the display 220.

The storage unit 270 may store data created in the client 120 (e.g., user content created through the microphone 263 or the camera 261) or data received from an external device through the communication unit 250 (e.g., information related to advertisement content or broadcast content). According to an embodiment, the storage unit 270 may store a fingerprint. A 'fingerprint' is information to identify broadcast content, and may be called identifier or identification information. The storage unit 270 may store content identification (IDs) by broadcast content items, and one or more fingerprints corresponding to the content IDs. The storage unit 270 may store various information related to the user of the client 120, e.g., a phone number, age, hobby, address, occupation, photos, etc.

Figure 3:
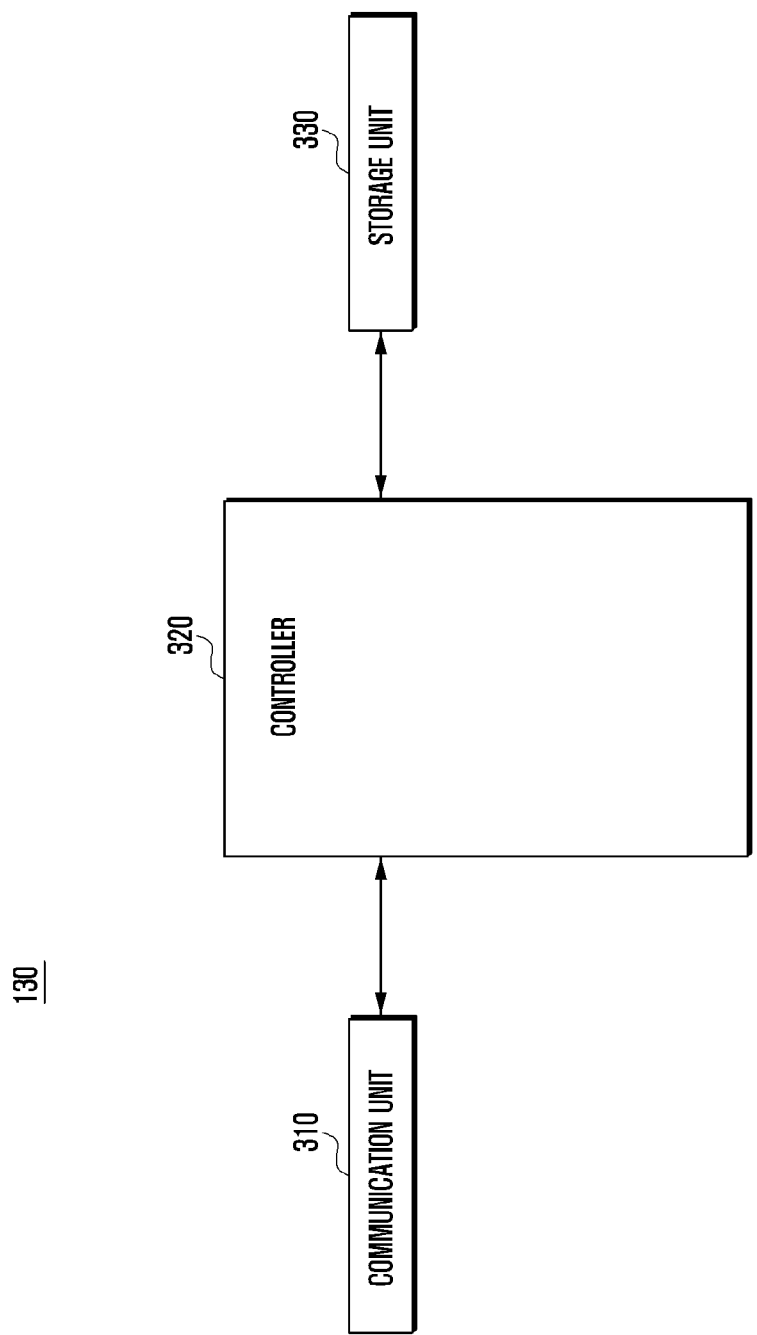
FIG. 3 is a block diagram showing an electronic device according to an embodiment of the present disclosure.

FIG. 3 is a block diagram showing an electronic device (e.g., the electronic device 130 of FIG. 1) according to an embodiment of the present disclosure.

The electronic device 130 may include a communication unit 310, a controller 320 and a storage unit 330.

The communication unit 310 may receive viewing information from the client 120. The communication unit 310 may receive advertising schedule information from at least one broadcast server. According to an embodiment, the communication unit 310 may receive advertisement content material, advertisement content, or an advertisement target value of advertisement content, from the advertisement provider device 101. The communication unit 310 may transmit a broadcasting request of advertisement content to a particular broadcast server under the control of the controller 320. That is, the communication unit 310 may transmit/receive data or signals to/from external devices under the control of the controller 320.

The controller 320 may analyze the effectiveness of advertising expected when particular advertisement content is broadcast, based on viewing information and advertising schedule information. The controller 320 may determine a broadcasting time or a broadcast server to broadcast particular advertisement content, based on the analysis of the effectiveness of advertising. For example, the controller 320 may determine a broadcasting time or a broadcast server to achieve a predetermined advertisement target value of particular advertisement content, based on the viewing information and advertising schedule information. The controller 320 may determine a broadcasting time or a broadcast server that enables particular advertisement content to closest match the predetermined advertisement target value. The advertisement target value may include a reach of advertisement, a frequency, an effective reach (reach n+), an advertisement budget, or a gross rating point (GRP), which may be considered as target values for particular advertisement content.

According to an embodiment, the controller 320 may identify a GRP of particular advertisement content. The controller 320 may analyze a real-time view rate of broadcast content broadcast by at least one broadcast server, based on viewing information. The controller 320 may analyze the effectiveness of advertising that can be expected when particular advertisement content is broadcast in a potential advertising time slot, based on advertising schedule information and a real-time view rate. The controller 320 may determine a broadcast server that will broadcast particular advertisement content or a broadcasting time during which the advertisement content item will be broadcast, based on the analyzed effectiveness of advertising.

According to an embodiment, based on the advertising schedule information, the viewing information and advertisement target values by a plurality of advertisement content items, the controller 320 may determine broadcasting times or a broadcast server by the plurality of advertisement content items.

TABLE I

[an example of viewing information according to various embodiments of the present disclosure]

| client | Furniture | | | | | | | | | |
|---|---|---|---|---|---|---|---|---|---|---|
| | 1 | 2 | 3 | 4 | 5 | 6 | 7 | 8 | 9 | 10 |
| No. of exposure to ad content A | 1 | 2 | 1 | 1 | 0 | 0 | 1 | 0 | 1 | 1 |
| No. of exposure to ad content B | 0 | 0 | 0 | 0 | 0 | 0 | 0 | 0 | 0 | 0 |
| Channel currently screening (broadcast server) | K | M | K | M | M | K | K | M | M | Not aired |

Table I shows an example of viewing information from one device (or a client 120, a piece of furniture) using Auto Content Recognition (ACR). The viewing information described in Table I includes two advertisement campaigns for 10 pieces of furniture, i.e., the number of exposure of two advertisement content items and information about a channel in currently viewing. In the embodiment, it is assumed that an advertising target value of Advertisement content A is 'Reach 2+ 30%,' and an advertising target value of Advertisement content B is 'Reach 1+ 50%.' It is also assumed that the electronic device 130 has secured potentially broadcasting slots during the same time zone, through advertisement schedule information received from broadcast servers (broadcast servers K and M). In this case, the electronic device 130 may analyze the effectiveness of advertising regarding the respective advertisement content items (advertisement content item A and advertisement content item B).

For example, the electronic device 130 or the controller 320 may perform analysis as four types of cases as follows.

Case 1: when advertisement content A is exposed to both broadcast servers K and M, Reach 2+ of the advertisement content A may be 60% and Reach 1+ of the advertisement content B may be 0%. That is, the advertisement content A may achieve the advertising target value; however, the advertisement content B may not achieve the advertising target value.

Case 2: when advertisement content B is exposed to both broadcast servers K and M, Reach 2+ of the advertisement content A may be 10% and Reach 1+ of the advertisement content B may be 90%. That is, the advertisement content B may achieve the advertising target value; however, the advertisement content A may not achieve the advertising target value.

Case 3: when advertisement content A is exposed to broadcast server K and advertisement content B is exposed to broadcast server M, Reach 2+ of the advertisement content A may be 40% and Reach 1+ of the advertisement content B may be 50%. That is, the advertisement content A, and the advertisement content B may achieve their advertising target values, respectively.

Case 4: when advertisement content B is exposed to broadcast server K and advertisement content A is exposed to broadcast server M, Reach 2+ of the advertisement content A may be 30% and Reach 1+ of the advertisement content B may be 40%. That is, the advertisement content A, and the advertisement content B may not achieve their advertising target values, respectively.

Therefore, the electronic device 130 may determine to proceed with Case 3 to obtain the most efficient advertising execution result. That is, the electronic device 130 may determine to broadcast advertisement content A via broadcast server K and advertisement content B via broadcast server M.

In the embodiment, when particular advertisement content has been broadcast (i.e., the client 120 receives and displays the advertisement content), the controller 320 may reflect the advertising execution result of the advertisement content to set a broadcasting schedule for advertisement content. For example, since advertisement content with a target reach of 20 is broadcast, when the reach becomes 16, the controller 320 may determine a broadcasting time or a broadcast server that will broadcast the advertisement content, by reflecting information about a client 120 or advertising space that can additionally secure a reach of 4, based on the advertising schedule information.

In the embodiment, when the particular advertisement content has achieved the advertising target value, the controller 320 may analyze the execution result of the particular advertisement content to create the analysis data.

The storage unit 330 may store the received viewing information, advertising schedule information, or information about at least one advertisement content item. The information about advertisement content may be the advertisement content itself or may include advertising target values by advertisement content items, IDs of the advertisement content items, the contents (messages) of the advertisement.

In the embodiment, the electronic device 130 may further include a display (not shown) or an input unit (not shown).

The display may display a campaign registration screen for advertisement content. The display may display analysis data obtained as an advertising execution result of advertisement content is analyzed when the advertising target value is achieved. The analysis data and the campaign registration screen will be described in detail later referring to FIGS. 8 and 9.

The input unit may receive an advertising budget or an advertising target value from the advertiser. The input unit may be installed into the electronic device 130 or may be implemented with an additional input system separated from the electronic device 130.

Figure 4:
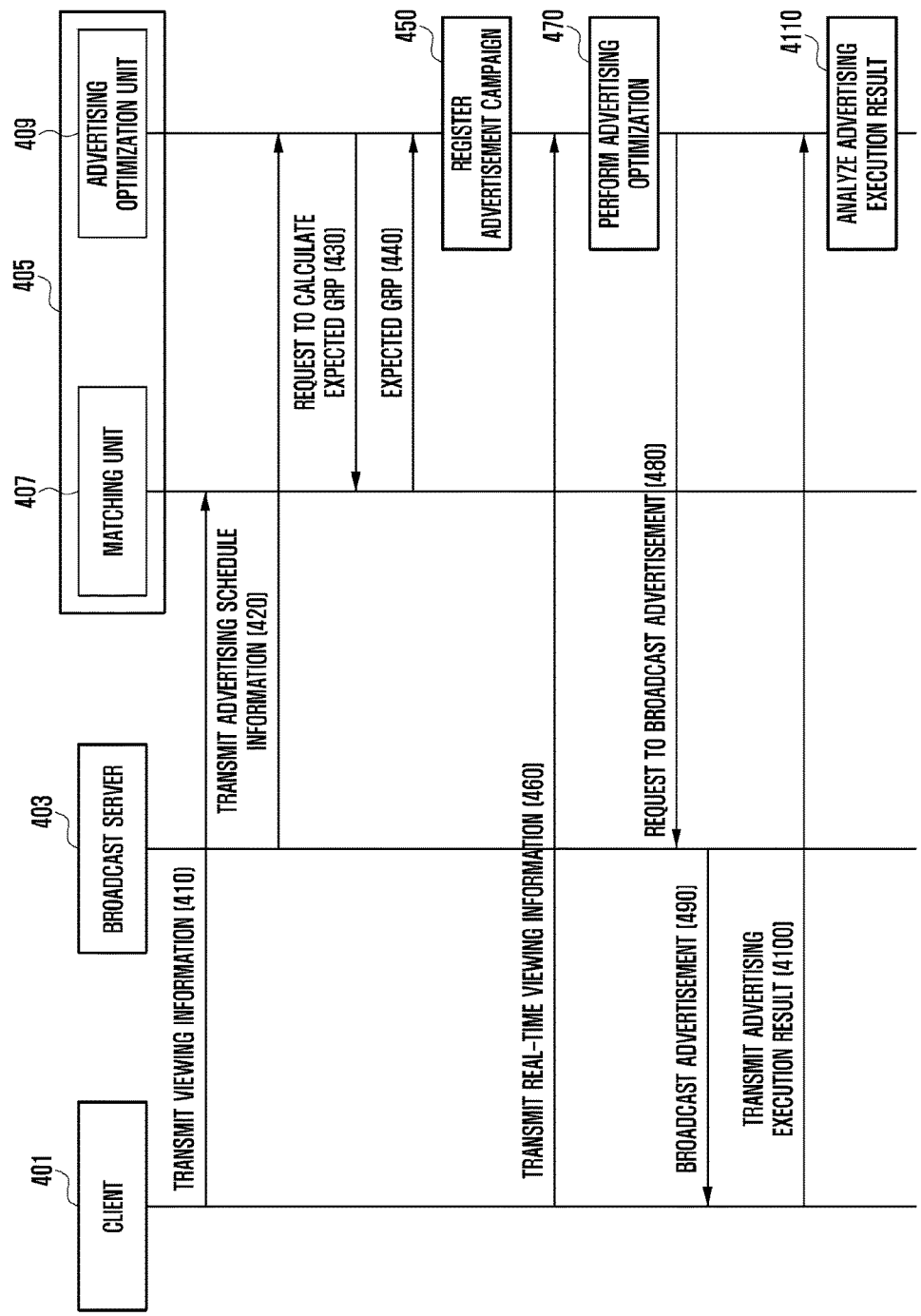
FIG. 4 is a flow diagram showing a method of providing advertising services according to an embodiment of the present disclosure.

FIG. 4 is a flow diagram showing a method of providing advertising services according to an embodiment of the present disclosure.

A client 401 (e.g., similar to the client 120 of FIG. 1) may transmit viewing information to a matching unit 407 (e.g., similar to the matching unit 131 of FIG. 1) of an electronic device 405 (e.g., similar to the electronic device 130 of FIG. 1) in operation 410. The viewing information may include: information about advertisement content or broadcast content that the client 401 is displaying; information about a broadcast server 403 (e.g., similar to the broadcast server 110 of FIG. 1) that has transmitted broadcast content or advertisement content; information about the client 401; or information about the user of the client 401. In the embodiment, the client 401 may continuously transmit, to the electronic device 405, the viewing information about broadcast content or advertisement content in viewing, in real-time.

The broadcast server 403 may transmit the advertising schedule information to an advertising optimization unit 409 (e.g., similar to the advertising optimization unit 133 of FIG. 1) of the electronic device 405 in operation 420. The advertising schedule information may be information about space (slot) for selling advertisement content. That is, advertising schedule information may be information about a broadcasting time that is free to potentially broadcast new advertisement content through the broadcast server 403.

The advertising optimization unit 409 may request the matching unit 407 to calculate an expected Gross Rating Point (GRP) in operation 430. The expected GRP may be a value of GRP expected when particular advertisement content is broadcast during a free space (time slot) in advertising schedule information.

The matching unit 407 may analyze an expected GRP based on the viewing information in operation 440. For example, the matching unit 407 may analyze the view rate based on the viewing information, and then a GRP expected when particular advertisement content is broadcast in a free space (slot), according to advertising schedule information. For example, it is assumed that, based on information about advertising areas, the electronic device 405 can secure, from the broadcast server 403, a one-minute advertising area (or four 15-second advertising areas) from 6:59 a.m. to 7:00 a.m. every Wednesday, for one month of July. In this case, the electronic device 405 may analyze, as 1.5%, the average view rate from 6:59 a.m. to 7:00 a.m. every Wednesday, based on corresponding month, corresponding broadcast content (broadcast program), and corresponding time zone. When the view rate analyzed by the electronic device 405 is 1.5%, the electronic device 405 may calculate an expected GRP as 6 (=1.5%×4).

The matching unit 407 may transmit the analyzed expected GRP to an advertising optimization unit 409.

The advertising optimization unit 409 may register advertising campaign in operation 450. For example, the advertising optimization unit 409 may register an advertising target value and information about particular advertisement content. For example, the advertising optimization unit 409 may receive an advertising execution budget for particular advertisement content and the effective frequency from the advertisement provider device 101 (or advertiser). In addition, the advertising optimization unit 409 may also receive an input to register the advertisement campaign via an additional input unit separated from the electronic device 405.

For example, when the advertising optimization unit 409 receives an advertising execution budget of 70 million Korean Won (KRW) and an effective frequency of 2, from an advertiser, the advertising optimization unit 409 may analyze an expected effective reach (reach 2+) according to the effective frequency or GRP that can be achieved with the execution budget of 70 million KRW, based on the existing execution data.

The electronic device 405 (or the advertising optimization unit 409) may receive real-time viewing information from the client 401 in operation 460. In the embodiment, the client 401 may transmit viewing information to the electronic device 405, in real-time, while viewing the particular broadcast content or advertisement content.

The electronic device 405 (or the advertising optimization unit 409) may perform an advertising optimization in operation 470. The advertising optimization unit 409 may determine a broadcasting time or a broadcast server 403 that will broadcast at least one advertisement content item, based on the real-time viewing information and the advertising schedule information. For example, the advertising optimization unit 409 may analyze a real-time view rate, based on real-time viewing information. The advertising optimization unit 409 may analyze a view rate of particular advertisement content with respect to clients that transmitted viewing information. The advertising optimization unit 409 may compare and analyze the effects of advertising expected when advertisement content is broadcast during a particular broadcasting time of a particular server to determine a broadcasting time or a broadcast server 403 that will broadcast advertisement content. For example, the advertising optimization unit 409 may determine broadcast content that creates the most efficient effectiveness of advertising to the advertising target value in a broadcasting time zone (slot) that is free in the broadcast server 403. For example, when broadcast content that the broadcast server 403 is broadcasting in a particular time zone has a target view rate of 20% and the view rate reaches 20%, the advertising optimization unit 409 may detect advertisement content that can achieve the target value. When broadcasting may be performed in one or more broadcast servers 403, the advertising optimization unit 409 may determine a broadcasting time or a broadcast server 403 that can efficiently achieve an advertising target value when particular advertisement content is broadcast.

In operation 480, the advertising optimization unit 409 may make a request to broadcast particular advertisement content during the determined broadcasting time from the broadcast server 403 determined based on the analyzed effectiveness of advertising.

In operation 490, the broadcast server 403 may broadcast the advertisement content during the time requested by the electronic device 405, in response to the advertising broadcast request from the electronic device 405. That is, the broadcast server 403 may transmit the advertisement content to the client 401. The client 401 may display broadcast content or advertisement content received from the broadcast server 403.

The client 401 may transmit the advertising execution result to the electronic device 405 in operation 4100. For example, when the client 401 receives and displays particular advertisement content, the client 401 may transmit information indicating that the client 401 has viewed the advertisement content to the electronic device 405 (or the advertising optimization unit 409).

In operation 4110, the electronic device 405 (or the advertising optimization unit 409) may analyze the advertising execution result, received from the client 401, to create the analysis data. The analysis data may include a budget of particular advertisement content, the reach, the effective reach, GRP, and CPRP.

Figure 5:
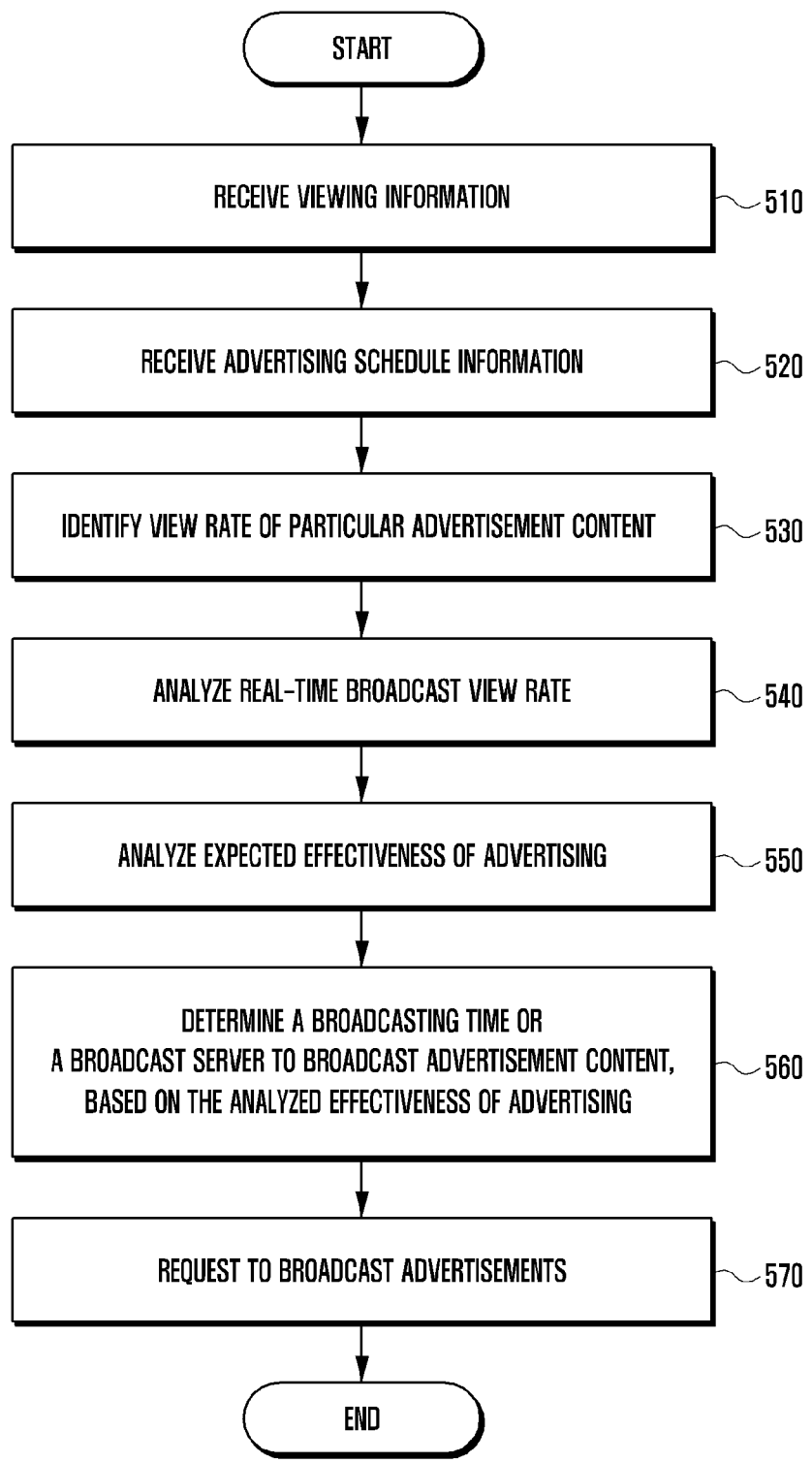
FIG. 5 is a flow diagram showing a method of providing advertising services by an electronic device according to an embodiment of the present disclosure.

FIG. 5 is a flow diagram showing a method of providing advertising services by an electronic device 130 according to an embodiment of the present disclosure.

The electronic device 130 may receive viewing information from the client 120 in operation 510. The client 120 may be a device that can receive broadcast content or advertisement content from a broadcast server and display the received content. For example, the client 120 may be a smart TV. The viewing information may include: information about advertisement content or broadcast content that the client 120 is viewing; or information about the broadcast server that has transmitted the broadcast content or the advertisement content.

The electronic device 130 may receive advertising schedule information from at least one broadcast server in operation 520. The advertising schedule information may be broadcasting schedule information of broadcast programs. The advertising schedule information may include information about time slots into which advertisements by broadcasting time zones of a broadcast server can be inserted.

The electronic device 130 may check the GRP of advertisement content in operation 530. In the embodiment, the electronic device 130 may check whether the respective advertisement content items reach advertising target values or how close to advertising target values the respective advertisement content items reach. The advertisement target value may include a target reach of advertisement, a frequency, an effective reach (reach n+), an advertisement budget, or a gross rating point (GRP), which are as target values for particular advertisement content.

The electronic device 130 may analyze a real-time broadcasting view rate based on viewing information in operation 540. For example, when the client 120 is particularly viewing broadcast content B received from broadcast server A, the electronic device 130 may ascertain, from the viewing information received from the client 120, that the client 120 is viewing broadcast content B that broadcast server A is broadcasting. When the electronic device 130 receives viewing information items from one or more of the client 120, respectively, it may analyze a view rate based on the clients that have transmitted the viewing information, as a sample. For example, of the 10 clients that have transmitted viewing information, when three clients are displaying broadcast content that broadcast server A is broadcasting; two clients are displaying broadcast content that broadcast server B is broadcasting; and five clients are displaying broadcast content that broadcast server C is broadcasting, the electronic device 130 may ascertain that the view rates of broadcast content items broadcasted by the broadcast servers A, B, and C are 30%, 20%, and 50%, respectively.

In operation 550, the electronic device 130 may analyze the effectiveness of advertising expected when particular advertisement content is broadcast in a potential advertising time zone, based on the advertising schedule information and the real-time view rate. For example, based on a real-time view rate of broadcast content that is being broadcast right before a potential advertising time slot, when at least one advertisement content item is broadcast during the potential advertising time slot, the electronic device 130 may analyze a reach of the advertisement content, the frequency, the effective reach (reach n+), the GRP, etc., which may be achieved extra.

In operation 560, the electronic device 130 may determine a broadcasting time or a broadcast server that will broadcast particular advertisement content, based on the analyzed effectiveness of advertising. In the embodiment, the electronic device 130 may map one or more advertisement content items to potential advertising time slots of one or more broadcast servers. For example, based on the view rate and how close to a target value the advertisement content reaches, the electronic device 130 may determine that: first advertisement content is to be broadcast at 4 p.m. via broadcast server A; second advertisement content is to be broadcast at 4 p.m. via broadcast server B; and third advertisement content is to be broadcast at 5 p.m. via broadcast server A.

In operation 570, the electronic device 130 may transmit an advertisement broadcasting request to the determined broadcast server so that the particular advertisement content is broadcast during the determined time. For example, when the electronic device 130 determines that it is the most efficient to broadcast particular advertisement content at 4 p.m. on Tuesday via broadcast server A, it may request the broadcast server A to broadcast the particular advertisement content at 4 p.m. on Tuesday.

Figure 6:
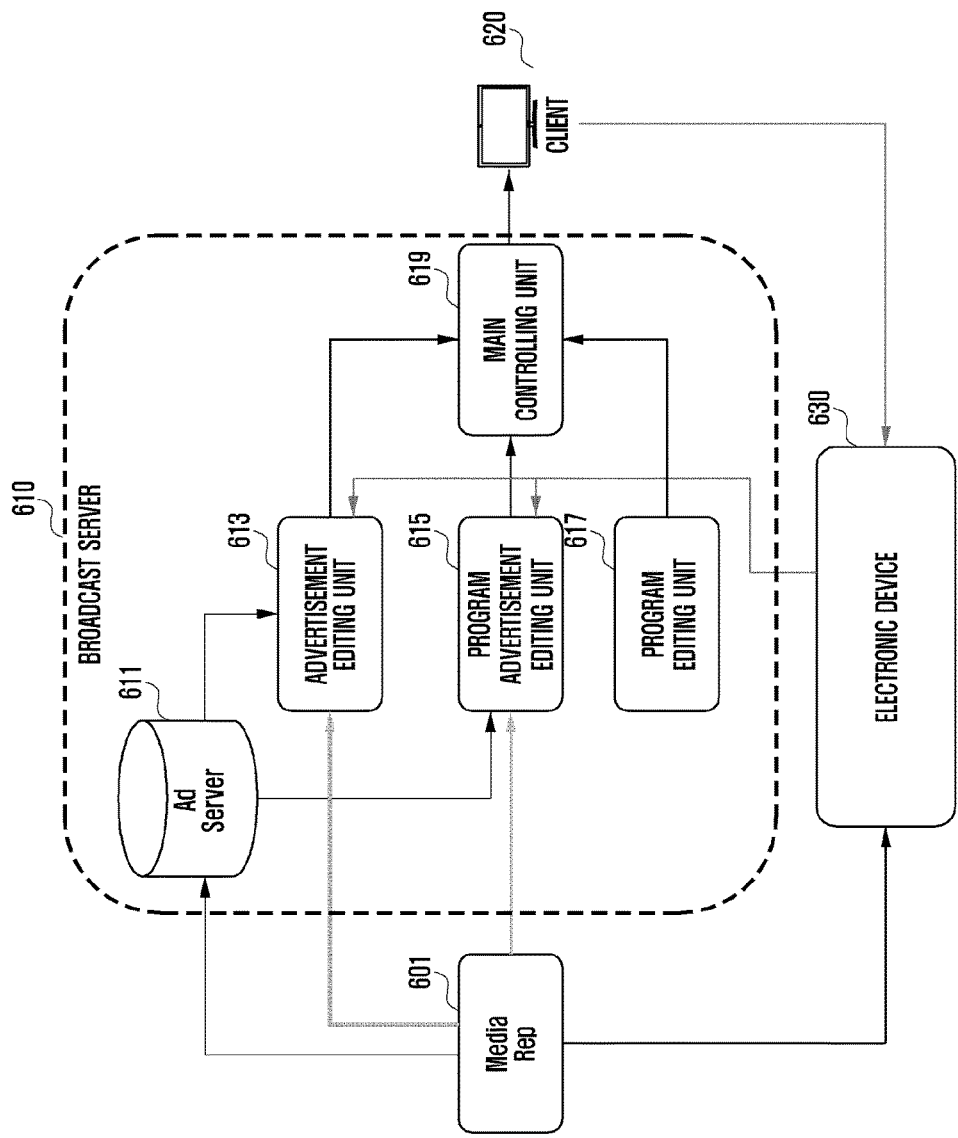
FIG. 6 is a flow diagram showing a method of transmitting data by a system for providing advertising services according to an embodiment of the present disclosure.

FIG. 6 is a flow diagram showing a method of transmitting data by a system for providing advertising services according to an embodiment of the present disclosure.

The media representative 601 may transmit material of advertisement content to an advertisement server, Ad server 611 of a broadcast server 610 (e.g., similar to the broadcast server 110 of FIG. 1). For example, the material of advertisement content may include data for creating advertisement content or previously created advertisement content.

The media representative 601 may be the advertisement provider device 101 shown in FIG. 1. The media representative 601 may transmit a list of advertisements to a station break (SB) advertisement editing unit, or SB advertisement editing unit 613 and a program advertisement editing unit 615 in the broadcast server 610. For example, the media representative 601 may transmit a spot advertisement or a list of subtitle advertisements to the SB advertisement editing unit 613. The media representative 601 may transmit, to the program advertisement editing unit 615, a list of program advertisements (e.g., commercial (CM) advertisements before and after a broadcast program). The program advertisements, e.g., CM advertisements, refer to advertisements that are broadcast along with particular broadcast content (a broadcast program) before and after the particular broadcast content. The spot advertisements refer to brief advertisements that are broadcast during a relatively short period of time, except for program advertisements, or advertisements that are broadcast in a broadcast program break irrespective of particular broadcast content. For example, in a general broadcasting process, after first broadcast content (first program) is broadcast, broadcasting items are broadcast in the following sequence: a station break, a guide broadcast for introducing broadcast content to be broadcast, a spot advertisement, a title video of second broadcast content (second program), pre-CM broadcast, second broadcast content (second program), post-CM broadcast, and a station break. Therefore, the media representative 601 may transmit material of advertisement content to an advertisement editing unit of the broadcast server 610.

The media representative 601 may transmit a request for advertising optimization to the electronic device 630. For example, the media representative 601 may transmit, to an electronic device 630 (e.g., similar to the electronic device 130 of FIG. 1), an order of advertisement that has not been sold. The order of advertisement that has not been sold may include information about target advertisement content (or material of advertisement content) to be processed in an advertising optimization and information about an advertising target value of target advertisement content.

The broadcast server 610 may include the Ad server 611, the SB advertisement editing unit 613, a program advertisement editing unit 615, a program editing unit 617 and a main controlling unit 619.

The Ad server 611 may store at least one advertisement content items or at least one advertisement content material. The Ad server 611 may transmit the stored advertisement material to the SB advertisement editing unit 613 or the program advertisement editing unit 615.

The SB advertisement editing unit 613 may create SB advertisement content by using the received advertisement content material. The SB advertisement content may be advertisement content to be broadcast in a time slot between broadcast content that is being broadcast and the following broadcast content to be broadcast. In the embodiment, the SB advertisement editing unit 613 may receive an insertion request of particular advertisement content from the electronic device 630. For example, the insertion request of advertisement content may include a specific date, a specific time zone or information for designating particular advertisement content. The SB advertisement editing unit 613 may create advertisement content corresponding to the insertion request of particular advertisement content received from the electronic device 630. The SB advertisement editing unit 613 may transmit the SB advertisement content to the main controlling unit 619.

The program advertisement editing unit 615 may create advertisement content by using the received advertisement content material. The program advertisement editing unit 615 may create advertisement content as CM advertisement to be broadcast before and after the broadcast content. In the embodiment, the program advertisement editing unit 615 may receive an insertion request of particular advertisement content from the electronic device 630. The insertion request of advertisement content may include a specific date, a specific time zone, information related to broadcast content or information for designating particular advertisement content. The program advertisement editing unit 615 may create advertisement content corresponding to the insertion request of particular advertisement content received from the electronic device 630. The program advertisement editing unit 615 may transmit the advertisement content to the main controlling unit 619.

The program editing unit 617 may create broadcast content to be broadcast. The program editing unit 617 may transmit the created broadcast content to the main controlling unit 619.

The main controlling unit 619 may transmit broadcast content or advertisement content to a client 620 (e.g., similar to the client 120 of FIG. 1), according to a predetermined broadcasting schedule.

The client 620 may display the broadcast content (i.e., broadcasts or broadcast programs) or advertisement content, received from the broadcast server 610 (e.g., the main controlling unit 619). The client 620 may transmit viewing information related to advertisement content or broadcast content in display to the electronic device 630. The viewing information may include: information about a broadcast server 610 that transmits advertisement content or broadcast content that is currently displayed (e.g., information about a broadcasting station that broadcasts a broadcast program currently in view); information about advertisement content or broadcast content being displayed; information about the client 620; or information about the user of the client 620.

The electronic device 630 may determine a broadcast schedule for particular advertisement content items according to an order for an advertisement received from a media representative 601. For example, the electronic device 630 may analyze a real-time view rate based on the viewing information received from the client 620. For example, the electronic device 630 may receive viewing information from one or more of the client 620. In this case, the electronic device 630 may analyze a view rate of a broadcast that at least one or more clients 620 as the sample group of clients that have received viewing information are viewing in real-time. For example, when the electronic device 630 has received viewing information from 10 clients 620, and the analysis result of the received viewing information says that three clients are displaying broadcast content received from a broadcast server 610 (or broadcast server A), the electronic device 630 may ascertain that the view rate of the broadcast content from the broadcast server 610 (or broadcast server A) is 30%. The electronic device 630 may determine a broadcasting schedule of advertisement content (e.g., a broadcasting time or a broadcast server 610 that will broadcast advertisement content) based on a real-time view rate. The electronic device 630 may transmit a request for inserting advertisement content to the broadcast server 610 (e.g., the SB advertisement editing unit 613 or a program advertisement editing unit 615), according to the determined broadcasting schedule.

Figure 7:
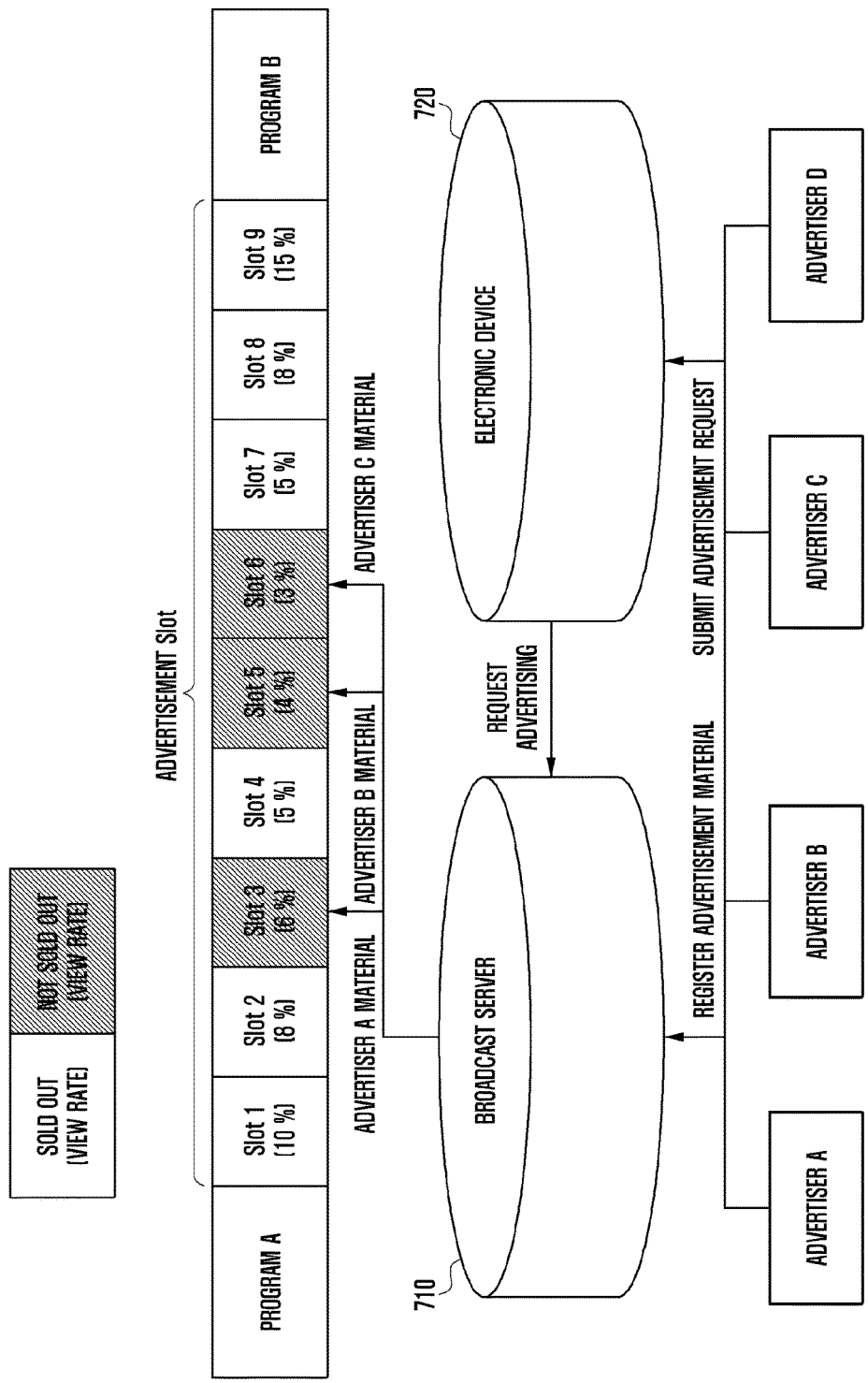
FIG. 7 is a diagram showing a method of providing advertising services according to an embodiment of the present disclosure.

FIG. 7 is a diagram showing a method of providing advertising services according to an embodiment of the present disclosure.

Referring to FIG. 7, the embodiment shows nine advertisement slots between two broadcast programs (broadcast content). In the embodiment of FIG. 7, Program A or B may include particular broadcast content or advertisement content. The embodiment shows a case where there are nine slots between Programs A and B during which advertisement content can be broadcast. For example, when Program B is broadcast after 4 minutes and 30 seconds from a time point that Program A is completely broadcast, there may be nine time slots between Programs A and B into each of which a 30-second advertisement content item is inserted. In this case, the respective slots may have view rates that differ from each other according to broadcast programs. For example, when Program B has a higher view rate than Program A (e.g., Program B is more popular to viewers than Program A), the closer the slot to Program B the higher the view rate may be. In this case, part of the slots may have been sold out to broadcast particular advertisement content and the other part may have not yet been sold so that they may receive new advertisement content. That is, time slot 3, time slot 5, and time slot 6 in the shaded portions refer to slots into which new advertisement content can be inserted.

Advertisers (Advertisers A to D) may register material of advertisement content items related to their products on the broadcast server 710 (e.g., similar to the broadcast server 110 of FIG. 1), respectively. Advertisers may submit advertising requests to the electronic device 720. The respective advertisements that the advertisers submitted to the electronic device 720 (e.g., similar to the electronic device 130 of FIG. 1) have reaches, frequencies or GRPs that may differ from each other in terms of target value.

The broadcast server 710 may transmit advertising schedule information to the electronic device 720. The advertising schedule information may include information about spaces (slots) into which new advertisement content may be inserted.

When the electronic device 720 receives requests of advertisements from advertisers, it may identify the advertisement target values of the respective advertisement content items. The electronic device 720 may detect the most proper broadcasting times to achieve the advertisement target values of one or more advertisement content items, respectively, based on broadcast view rate. For example, it is assumed that an advertisement content item of Advertiser A has a view rate less than 7% from the target view rate; an advertisement content item of Advertiser B has a view rate less than 4% from the target view rate; an advertisement content item of Advertiser C has a view rate less than 1% from the target view rate; and an advertisement content item of Advertiser D has a view rate less than 3% from the target view rate. The view rates of time slot 3, time slot 5, and time slot 6 into which new advertisement content items can be inserted are 6%, 4%, and 3%, respectively. In this case, the electronic device 720 may analyze the effectiveness of advertising that can be expected when new advertisement content items are inserted into time slot 3, time slot 5, and time slot 6, respectively. For example, when an advertisement content item of Advertiser C that needs to further secure an extra 1% for the target view rate is inserted into time slot 3 that can secure a view rate of 6%, the advertising execution may be inefficient. When one or more advertisement content items are inserted into time slot 3, time slot 5, and time slot 6, which are empty, the electronic device 720 may detect a case to meet a condition where the highest number of advertisement content items can achieve their advertisement target values. For example, the electronic device 720 may determine that the most efficient advertising execution is that the advertisement content items of Advertisers A, B and D are inserted into time slot 3, time slot 5, and time slot 6, respectively. In this case, the advertisement content item of Advertiser C may not be broadcast; however, the advertisement content items of the other Advertisers A, B, and D may reach the advertisement target values or values closely thereto.

The electronic device 720 may transmit a broadcasting request to the broadcast server 710 based on the determination result, so that the broadcast server 710 inserts advertisement content items to corresponding slots and broadcasts them. After that, when the electronic device 720 receives information about new advertisement space (slot), it may repeat the same process for advertisement content items that have not reached their advertisement target values.

FIG. 8 is a diagram showing data obtained from the analysis of the advertisement content execution result by a method and the electronic device 130 (of FIG. 1) for providing advertising services according to an embodiment of the present disclosure.

According to an embodiment, the electronic device 130 may identify the effectiveness of advertising according to the method of providing advertising services of the present disclosure and effectiveness of advertising according to conventional methods of providing advertising services, analyze the effectiveness of advertising, and create the analyzed data. For example, an electronic device (e.g., the client 120 of FIG. 1) may create data in a table form which compares the budget, reach, GRP and CPRP for a case where particular advertisement content is processed by the advertising optimization of the method of providing advertising services according to the present disclosure (e.g., AdHub), with those for a case of general advertisement. According to an embodiment, the electronic device 130 may create and store data for the total, budget, reach, GRP and CPRP, which are produced as the case processed by the optimization and the case for a general advertisement (e.g., a general TB platform) are combined.

FIG. 8 is an example of data that the electronic device 130 created in the table form from the execution result of advertisement content, and shows that the advertisement processed by the optimization uses less budget than a general advertisement; however it has reached a higher GRP than the general advertisement. Therefore, various embodiments of the present disclosure allow users to easily check the execution result of particular advertisement content. After that, the electronic device 130 may provide after-advertising services by reflecting the advertising execution result.

FIG. 9 is a diagram showing a process to set a target value of effectiveness of advertising by the method and the electronic device 130 of FIG. 1 for providing advertising services according to an embodiment of the present disclosure.

According to an embodiment, the electronic device 130 may receive advertisement target values by advertisement content items. According to an embodiment, the electronic device 130 may include an input unit for receiving advertisement target values. The electronic device 130 may be connected to an external input device to receive advertisement target values therefrom. According to an embodiment, the electronic device 130 may receive advertisement target values by advertisement content items from an external device or a server. The advertisement target value may include a name of an advertisement, an advertisement budget, an effective frequency and expected reach information. According to an embodiment, the electronic device 130 may include a display. For example, the electronic device 130 may display a registration screen for setting an advertisement target value. For example, the electronic device 130 may receive the user's inputs such as an advertisement budget, an effective frequency, etc., via the advertisement registration screen.

According to an embodiment, the electronic device 130 may analyze a reach expected according to an advertising execution budget and the effective frequency, and inform the analyzed reach. For example, when the electronic device 130 receives, as advertisement target values for particular advertisement content, an advertising execution budget of 70 million Korean Won (KRW) and an effective frequency of 2, from an advertiser (e.g., the advertisement provider device 101), it may analyze an average expected reach (reach 2+) for an effective frequency of 2, based on the accumulative advertising execution analysis data, and inform the analyzed reach as shown in FIG. 9.

FIG. 10 is a diagram showing an advertising schedule used in the method and electronic device for providing advertising services according to an embodiment of the present disclosure.

In the embodiment, the advertising schedule information may include information about advertisement content or broadcast content that a particular advertising server is broadcasting. The advertising schedule information may include: information 1030 about broadcast content broadcast on broadcasting dates (or days); broadcasting time 1020; information about potential advertising time slots; advertisement cost (unit cost); and broadcast rating 1010. For example, broadcast ratings 1010 may be information about ratings determined based on the broadcasting time zones, a general view rate of broadcast content, etc. For example, the time zone between 8:00 a.m. and 9:30 a.m., during which a morning soap opera screens after the morning news with a high average view rate, may be Rating A; and the early morning time zone and the lunch time zone, in a low average view rate, may be Rating C. That is, the broadcasting ratings 1010 may be arranged to different ratings according to time zones. Referring to FIG. 10, time slots 1001 expressed by a solid bold line in respective time zones may refer to potential advertising time slots. That is, broadcast schedule information may include information about times during which advertisements are broadcast. In this case, broadcast schedule information may include information about time slots into which additional advertisements can be inserted, as well as existing advertisements that have been already sold. For example, advertising schedule information may further provide or display information about time slots into which new advertisements can be inserted, besides information about times reserved for advertisements to be broadcast.

The broadcast schedule information may include information about costs of advertisements to be broadcast along with broadcast content items. For example, as shown in FIG. 10, the numbers at the right of names of the respective broadcast content items refer to advertising costs. The embodiment of FIG. 10 shows advertising costs based on a unit cost of 1000 KRW based on 15 seconds. For example, for an advertisement to be broadcast with a soap opera at 9:00 a.m. (e.g., an advertisement before or after the soap opera is broadcast), the advertising cost for a 15-second advertisement may be 2,190,000 KRW. As another example, for an advertisement to be broadcast with Everyday Gymnastics at 6:00 a.m., the advertising cost for a 15-second advertisement may be 870,000 KRW. That is, advertising costs may be determined according to times zones based on broadcasting ratings 1010.

The embodiment of FIG. 10 shows advertising schedule information in the form of a timetable (schedule), but is not limited thereto. It should be understood that the embodiment may be modified to various embodiments so that the advertising schedule information may be implemented to include various information, such as potential advertising time zones, advertising costs, etc.

According to various embodiments of the present disclosure, the electronic device 130 may receive broadcast schedule information from the broadcast server 110, identify potential advertising time zones, and provide optimized advertisement broadcasting based on advertising costs by time zones and a real-time view rate.

The method and electronic device for providing advertising services according to various embodiments of the present disclosure can determine whether to execute advertising based on a real-time view rate, thereby increasing the effectiveness of advertising.

The method and electronic device can also provide advertising services according to a real-time view rate and a revealing state by advertisement content, thereby increasing the effectiveness of advertising and preventing advertisement content from being endlessly created.

In addition, the method and electronic device can reduce human resources and material resources required for obtaining a target value of the effectiveness of advertising, thereby increasing the efficiency of advertising services.

The term 'module' as used in various embodiments of the present disclosure may mean a unit including one of hardware, software, and firmware or any combination of two or more of them. The 'module' may be interchangeable with the term 'unit,' 'logic,' 'logical block,' 'component,' or 'circuit.' The 'module' may be the smallest unit of an integrated component or a part thereof. The 'module' may be the smallest unit that performs one or more functions or a part thereof. The 'module' may be mechanically or electronically implemented. For example, the 'module' according to various embodiments of the present disclosure may include at least one of the following: application-specific integrated circuit (ASIC) chips, field-programmable gate arrays (FPGAs), and programmable-logic devices for performing certain operations, which are now known or will be developed in the future.

At least part of the method (e.g., operations) or system (e.g., modules or functions) according to various embodiments of the present disclosure can be implemented with instructions as programming modules that are stored in computer-readable storage media. One or more processors can execute instructions, thereby performing the functions. An example of the computer-readable storage media may be storage. At least part of the programming modules can be implemented (executed) by a processor. At least part of the programming module may include modules, programs, routines, sets of instructions or processes, etc., in order to perform one or more functions.

Examples of computer-readable media include: magnetic media, such as hard disks, floppy disks, and magnetic tape; optical media such as Compact Disc Read Only Memory (CD-ROM) disks and Digital Versatile Disc (DVD); magneto-optical media, such as floptical disks; and hardware devices that are specially configured to store and perform program instructions (e.g., programming modules), such as read-only memory (ROM), random access memory (RAM), flash memory, etc. Examples of program instructions include machine code instructions created by assembly languages, such as a compiler, and code instructions created by a high-level programming language executable in computers using an interpreter, etc. The described hardware devices may be configured to act as one or more software modules in order to perform the operations and methods described above, or vice versa.

Modules or programming modules according to various embodiments of the present disclosure may include one or more components, remove part of them described above, or include new components. The operations performed by modules, programming modules, or the other components, according to various embodiments of the present disclosure, may be executed in serial, parallel, repetitive or heuristic fashion. Part of the operations can be executed in any other order, skipped, or executed with additional operations.

The embodiments of the present disclosure described in the description and drawings are merely provided to assist in a comprehensive understanding of the disclosure and are not suggestive of limitation. Although embodiments of the disclosure have been described in detail above, it should be understood that many variations and modifications of the basic inventive concept herein described, which may be apparent to those skilled in the art, will still fall within the spirit and scope of the embodiments of the disclosure as defined in the appended claims.

What is claimed is:

1. An electronic device in electronic communication with at least one broadcast server that broadcasts content, having real-time viewing rate of the broadcast content and advertising schedule information, and at least one client having viewing information, the electronic device comprising:
   a communication circuitry configured to receive a) the viewing information from the at least one client, and b) the real-time viewing rate of the broadcast content and the advertising schedule information from the at least one broadcast server;
   processor configured to:
      analyze the received real-time viewing rate of the broadcast content that the at least one broadcast server is broadcasting, based on the received viewing information,
      analyze an effectiveness of advertising that can be expected when advertisement content is broadcast, based on the received real-time viewing rate and the received advertising schedule information,
      determine at least one of a broadcasting time and a broadcast server that broadcasts the advertisement content, according to the analyzed effectiveness of advertising, and
      request the determined broadcast server to broadcast the advertisement content at the determined broadcasting time; and
   a memory configured to store at least one of the received viewing information, the received advertisement schedule information, or information about the advertisement content,
   wherein the advertising schedule information comprises information about costs of advertisements to be broadcast along with the broadcast content and the information about at least one slot into which new advertisement content is potentially inserted.

2. The electronic device of claim 1, wherein the viewing information comprises one of:
   i) information about advertisement content or broadcast content that at least one client is viewing, ii) information about the broadcast server that has provided the broadcast content, iii) the advertisement content, or iv) information about the client.

3. The electronic device of claim 1, wherein the processor is configured to transmit, to the broadcast server determined by the processor, an advertising request for broadcasting the advertisement content during the broadcasting time determined by the processor.

4. The electronic device of claim 1, wherein the processor is configured to determine at least one of a broadcasting time and a broadcast server to achieve an advertising target value predetermined for the advertisement content.

5. The electronic device of claim 4, wherein the communication circuitry is configured to receive at least one of the advertisement content and the advertising target value from an external advertisement provider device.

6. The electronic device of claim 5, wherein the advertisement target value comprises:
   a reach of advertisement content, a frequency, an effective reach (reach n+), an advertising budget, or a gross rating point (GRP), which are target values for advertisement content.

7. The electronic device of claim 1, wherein the processor is configured to identify a gross rating point (GRP) of the advertisement content.

8. The electronic device of claim 1, wherein the processor is configured to determine at least one of broadcasting times and broadcast servers that broadcast a plurality of advertisement content items respectively, based on the advertising schedule information, the viewing information and advertisement target values by the plurality of advertisement content items.

9. The electronic device of claim 1, wherein the processor is configured to analyze, when the advertisement content has achieved an advertisement target value, an execution result of the advertisement content to create analyzed data.

10. A method of providing advertising services via an electronic device in electronic communication with at least one broadcast server that broadcasts content, having real-time viewing rate of the broadcast content and advertising schedule information, and at least one client having viewing information, the method comprising:
   receiving the viewing information from the at least one client;
   receiving the advertising schedule information from at least one broadcast server;
   analyzing the real-time viewing rate of the broadcast content that the at least one
   broadcast server is broadcasting, based on the received viewing information;
   analyzing an effectiveness of advertising that can be expected when advertisement content is broadcast, based on the received real-time viewing rate and the received advertising schedule information,
   determining at least one of a broadcasting tune and a broadcast server that broadcasts the advertisement content based on the analyzed effectiveness of advertising analyzed; and
   requesting the determined broadcast server to broadcast the advertisement content during the determined broadcasting time,
   wherein the advertising, schedule information comprises information about costs of advertisements to be broadcast along with the broadcast content and information about at least one slot into which new advertisement content is potentially inserted.

11. The method of claim 10, wherein determining broadcasting time or a broadcast server comprises:
   determining a broadcasting time or a broadcast server to achieve an advertising target value predetermined for the advertisement content.

12. The method of claim 11, further comprising:
   receiving information about the advertisement content or the advertising target Value from an external advertisement provider device.

13. The method of claim 11, wherein the advertisement target value comprises:
   a reach of advertisement content, a frequency, an effective reach (reach n+), an advertising budget, or a gross rating point (GRP), which are target values for advertisement content.

14. The method of claim 10, further comprising:
   identifying a gross rating point (GRP) of the advertisement content.

15. The method of claim 10, wherein determining a broadcasting time or a broadcast server comprises:
   determining at least one of broadcasting times and broadcast servers that broadcast a plurality of advertisement content items respectively, based on the advertising schedule information, the viewing information and advertisement target values by the plurality of advertisement content items.

16. The method of claim 10, further comprising:
   when the advertisement content has achieved an advertisement target value, analyzing an execution result of the advertisement content to create analyzed data.

* * * * *